United States Patent
Lin

(10) Patent No.: US 7,512,775 B2
(45) Date of Patent: Mar. 31, 2009

(54) METHOD FOR INITIALIZING AND ACTUATING A PERIPHERAL AND DEVICE FOR PERFORMING THE METHOD

(75) Inventor: Feng-Yun Lin, Taipei Hsien (TW)

(73) Assignee: Evalue Technology Inc., Chung-Ho, Taipei Country (TW)

( * ) Notice: Subject to any disclaimer, the term of this patent is extended or adjusted under 35 U.S.C. 154(b) by 502 days.

(21) Appl. No.: 11/347,845

(22) Filed: Feb. 6, 2006

(65) Prior Publication Data

US 2007/0186087 A1  Aug. 9, 2007

(51) Int. Cl.
*G06F 15/177* (2006.01)
(52) U.S. Cl. .................. 713/1; 713/2; 713/100
(58) Field of Classification Search .......... 713/1, 713/2, 100
See application file for complete search history.

(56) References Cited

U.S. PATENT DOCUMENTS 6,990,685 B1 *  1/2006  Christensen et al. .......... 726/34
7,103,641 B2 *  9/2006  Brannock .................. 709/217
2001/0047471 A1 *  11/2001  Johnson ....................... 713/1
2002/0144115 A1 *  10/2002  Lemay et al. ............... 713/168
2005/0038986 A1 *  2/2005  Agan et al. .................. 713/2

* cited by examiner

Primary Examiner—Dennis M Butler

(57) ABSTRACT

A method for initializing and actuating a peripheral by a mainframe with initialization and actuation codes of the periphery stored in a memory comprises the steps of: detecting a peripheral being connected to the mainframe; detecting a type number of the peripheral; the CPU loading initial codes and actuation codes about the type number from the memory of the main frame; sending reset signals to peripheral to reset the peripheral; initializing and actuating the peripherals; sending the initialization and actuating process; and mainframe retaining to be connected to the peripheral. If it is detected that a peripheral is connected to the main frame, while the initialization and actuation codes in the memory of the main frame, the CPU loads the initialization and actuation codes from a memory of a peripheral and then the process enter to the sending step. The device for performing the method is also included.

3 Claims, 4 Drawing Sheets

METHOD FOR INITIALIZING AND ACTUATING A PERIPHERAL AND DEVICE FOR PERFORMING THE METHOD

FIELD OF THE INVENTION

The present invention relates to electronically initialization and actuation; and in particular to a method for initializing and actuating a peripheral by a mainframe, wherein the peripheral is unnecessary to equip a memory. The initialization and actuation codes are stored in the memory of the mainframe. Thereby the cost for installing a memory to the peripheral is saved. Furthermore, a device for performing the method is disclosed.

BACKGROUND OF THE INVENTION

In the prior art, the process for initializing and actuating a peripheral connected to a main frame is performed by the following steps of: turning the power of the system; a CPU of a main frame detecting a peripheral being connected thereto; the CPU calling the peripheral to input initialization codes; the peripheral loading the initialization codes from the main flash memory (an EEPROM) and then transferring the initialization codes to the flash memory of the main frame; then the CPU initiating the peripherals by using the initialization codes from the peripheral. Thereby in the prior art, the main frame and the peripheral concurrently initialize their functions by themselves. However in the prior art the main frame must is equipped with a flash memory and the periphery is also installed with a flash memory. Thereby cost is high. Thereby the initialization process is performed bi-directionally. It is cost-ineffective and process-complicated.

SUMMARY OF THE INVENTION

Accordingly, the primary object of the present invention is to provide a method for initializing and actuating a peripheral by a mainframe, wherein the peripheral is unnecessary to equip a memory. The initialization and actuation codes are stored in the memory of the mainframe. Thereby the cost for installing a memory to the peripheral is saved. Furthermore, a device for performing the method is disclosed.

To achieve above objects, the present invention provides a mainframe with initialization and actuation codes of initializing and actuating peripherals. The device comprises a mainframe; a CPU (central processing unit) in the mainframe; a memory for storing type numbers; initialization codes and actuation codes for various peripherals; the memory being connected to the CPU; wherein for the peripherals with initialization and actuation codes recorded in the memory, the type number is also recorded for identifying a peripheral with that type number; an I/O (input/output device) device for inputting the initialization codes and actuation codes to the memory of the mainframe; the I/O device being connected to CPU; initialization and actuation codes can be input to the CPU through the I/O device so that the memory can record the initialization and actuation code of that peripheral device. For the peripheral recorded with the initialization and actuation codes in the memory thereof, while the memory of the CPU has no the initialization and actuation code about the peripherals, the I/O device inputs the initialization and actuation code from the peripherals; the peripherals will call the initialization and actuation codes from the memories thereof. The operation is like that used in the prior art.

Furthermore, a method for initializing and actuating a peripheral by a mainframe with initialization and actuation codes of the periphery stored in a memory of the mainframe is also disclosed. The method comprises the steps of: detecting a peripheral being connected to the mainframe; detecting a type number of the peripheral; the CPU loading initial codes and actuation codes about the type number from the memory of the main frame; sending reset signals to peripheral to reset the peripheral; initializing and actuating the peripherals; and sending the initialization and actuating process; and mainframe retaining to be connected to the peripheral.

In detecting step, if it is detected that a peripheral is connected to the main frame, while the initialization and actuation codes in the memory of the main frame, the CPU loads the initialization and actuation codes from a memory of a peripheral and then the process enter to the sending step.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
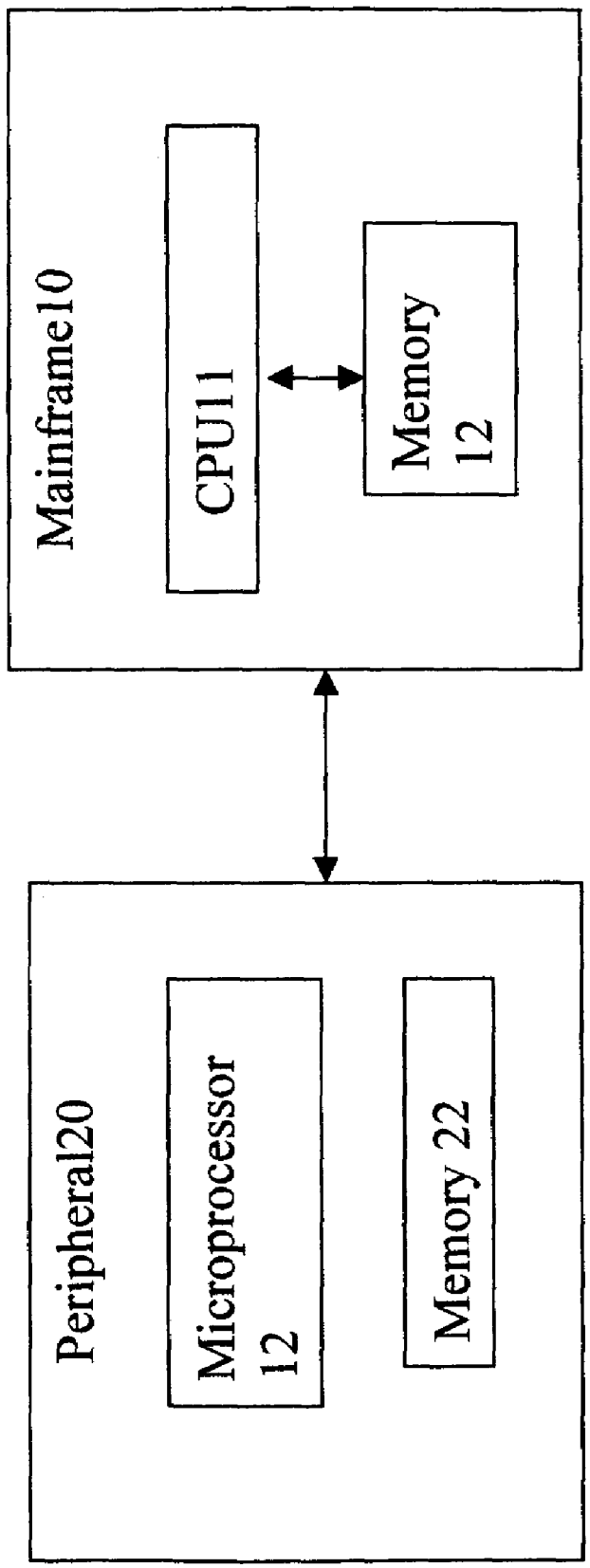
FIG. 1 is a structure diagram of a prior art.
Figure 2:
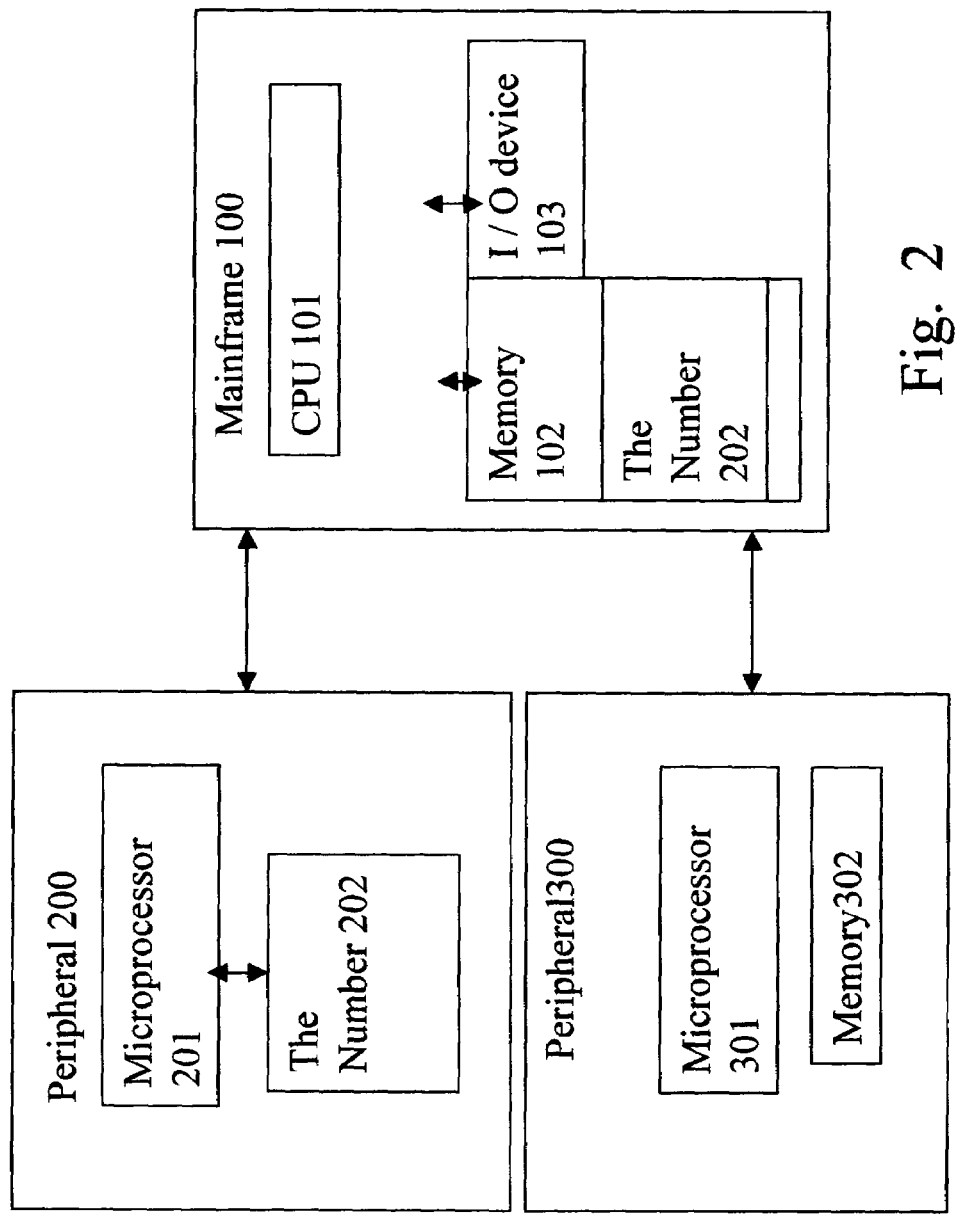
FIG. 2 is a structural diagram of the present invention.

Referring to FIG. 2, the system block diagram of the present invention is illustrated. The device of the present invention comprises the following components:

A mainframe 100 is included.

A CPU 101 is in the mainframe.

A memory 102, such as a flash memory; serves for storing the initialization codes and actuation codes for the peripherals. The memory is connected to the CPU 101. For the peripherals with initialization and actuation codes recorded in the memory, the type number 202 is also recorded for identifying a peripheral with that type number 202.

At least one peripheral 200 is connected to the mainframe 100. The peripheral 200 is given with a type number 202 for identification by the CPU. Thereby peripherals 200 contain all peripheral devices which can be connected to the mainframe, such as printers, disk drives, scanners, fax machines, and all other electronic devices which is connected to the mainframe, such as those used in plants, business machines, game machines, etc.

An I/O (input/output) device 103 (such as well known BIOS (basic input output system) serves to input the initialization codes and actuation codes to the memory 102. The I/O (input device) is connected to CPU 101. Initialization and actuation codes can be inputted to the CPU 101 through the I/O device 103 manually so that the memory 102 can record the initialization and actuation code of that peripheral device 200. Thus the CPU 100 can record initialization and actuation codes about the peripheral 200 as the CPU 101 detects that the peripheral 200 is connected to the mainframe 100. Furthermore, for the peripheral 200 recorded with the initialization and actuation codes in the memory thereof, while the memory of the CPU has no the initialization and actuation codes about the peripherals, the I/O device inputs the initialization and actuation code from the peripherals. The peripherals will call the initialization and actuation codes from the memories thereof. The operation is like that used in the prior art.

Figure 3:
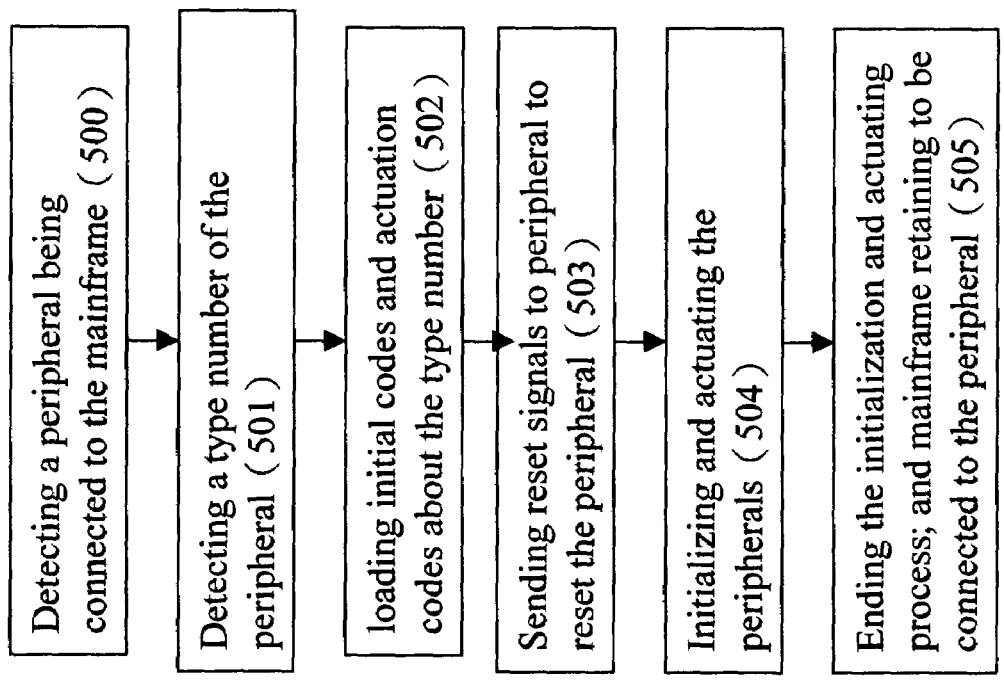
FIG. 3 is a flow diagram of the present invention showing the first embodiment of the present invention.

The method of the present invention comprises the following steps of: turning on the power of the system (referring to FIG. 3)

Detecting a peripheral being connected to the mainframe (step 500);

Detecting a type number of the peripheral (step 501);

The CPU of the main frame loading initial codes and actuation codes about the type number from a main memory of the main frame (step 502), such as a general used flash memory;

Sending reset signals to peripheral to reset the peripheral (step 503);

Initializing and actuating the peripherals (step 504);

Ending the initialization and actuating process; and mainframe retaining to connect to the peripheral (step 505).

Figure 4:
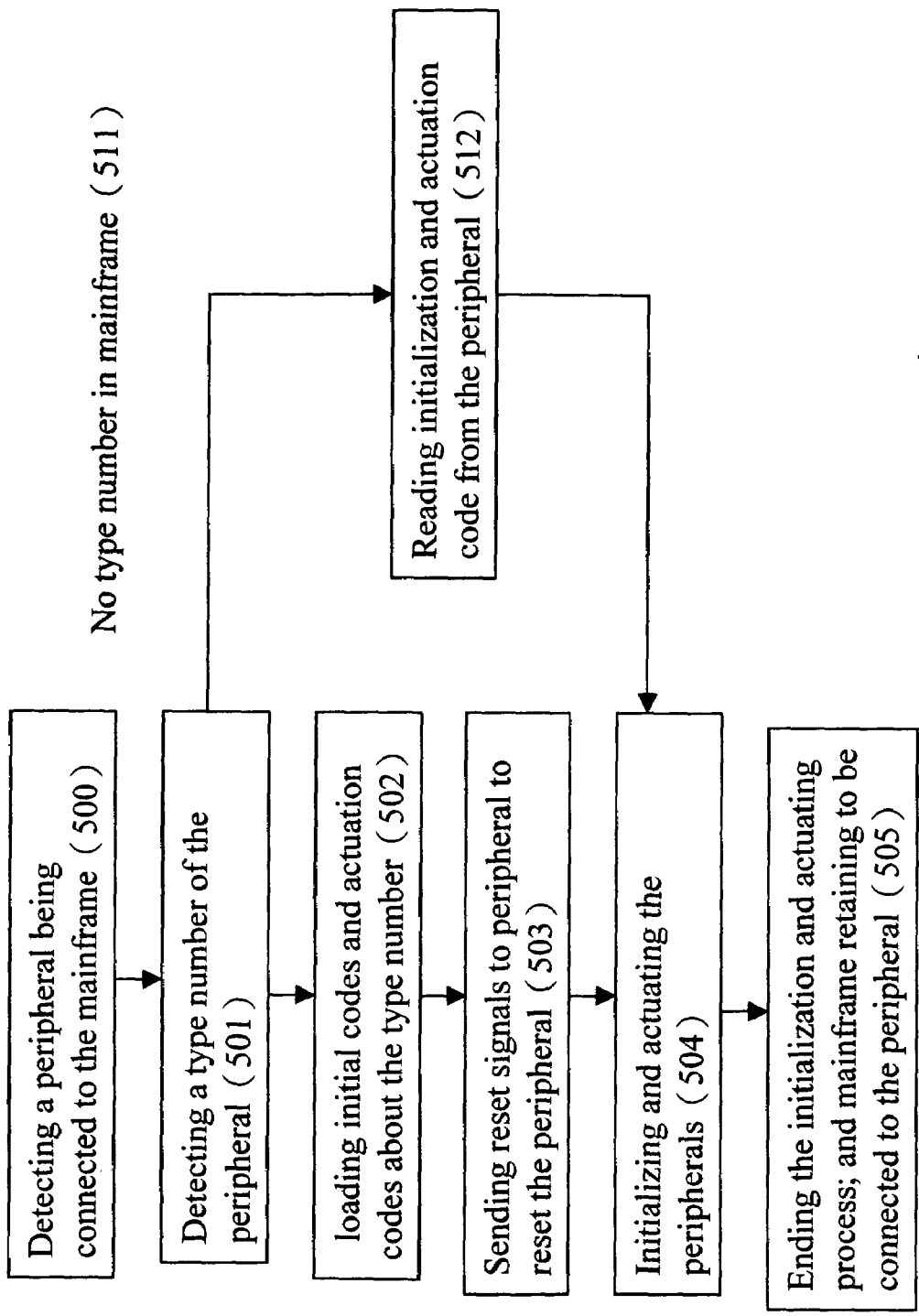
FIG. 4 is a flow diagram of the present invention showing the second embodiment of the present invention.

In another embodiment of the present invention as shown in FIG. 4, the present invention is also compatible with old peripherals, namely, the peripherals have their initialization and actuation codes in the memories thereof, while no initialization and actuation codes at the memory of the main frame. For this case, if the CPU detects that a peripheral is connected to the main frame, while the initialization and actuation codes in the memory of the main frame, the CPU loads the initialization and actuation codes from a memory of a peripheral (step 512). Moreover, the memory of the mainframe can store the initialization and actuation codes of the periphery so as to be used next time.

Furthermore, by the present invention, the peripheral is unnecessary to equip a memory. The initialization and actuation code is stored in the memory of the mainframe. Thereby the cost for installing a memory to the peripheral is saved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for initializing and actuating a peripheral by a mainframe with initialization and actuation codes of the periphery stored in a memory of the mainframe; wherein the mainframe includes a CPU; a memory for storing type numbers; initialization codes and actuation codes for various peripherals; the memory being connected to the CPU; an I/O (input/output device) device for inputting the initialization codes and actuation codes to the memory of the mainframe;

the method comprising the steps of:

detecting a peripheral being connected to the mainframe;

detecting a type number of the peripheral;

the CPU loading initial codes and actuation codes about the type number from the memory of the main frame;

sending reset signals to peripheral to reset the peripheral;

initializing and actuating the peripherals;

ending the initialization and actuating process; and mainframe retaining to be connected to the peripheral.

2. The method of claim 1, wherein in the step of detecting a peripheral being connected to the mainframe, if it is detected that a peripheral is connected to the mainframe, while the initialization and actuation codes in the memory of the main frame, the CPU loads the initialization and actuation codes from a memory of a peripheral and then the process enter to the sending step.

3. The method of claim 1, wherein the memory is a flash memory.

* * * * *